United States Patent [19]

Gardner

[11] 4,182,128
[45] Jan. 8, 1980

[54] UNDERGROUND PUMPED LIQUID ENERGY STORAGE SYSTEM AND METHOD

[75] Inventor: James H. Gardner, Salt Lake City, Utah

[73] Assignee: Oros Company, Salt Lake City, Utah

[21] Appl. No.: 856,248

[22] Filed: Dec. 1, 1977

[51] Int. Cl.$^2$ ............................................. F01K 23/00
[52] U.S. Cl. ......................................... 60/652; 60/398
[58] Field of Search ................. 60/641, 398, 652, 659; 290/52

[56] References Cited

U.S. PATENT DOCUMENTS

| | | | |
|---|---|---|---|
| 1,217,165 | 2/1917 | Fessenden | 60/641 |
| 1,247,520 | 11/1917 | Fessenden | 60/398 X |
| 3,538,340 | 11/1970 | Lang | 290/52 |
| 3,988,897 | 11/1976 | Strub | 60/652 |

Primary Examiner—Allen M. Ostrager
Attorney, Agent, or Firm—Calvin E. Thorpe

[57] ABSTRACT

Disclosed is a system and method for producing electrical power during peak power demand periods and for, in effect, storing electrical power or energy during low power demand periods. Two or more cavities are provided in an underground salt dome or other thick salt deposit, with a first one of the cavities being located above the level of the second. Oil or other liquid in which salt is substantially insoluble, such as saturated brine, is placed in at least one of the cavities for use as a working liquid to produce electrical power. The power is produced by delivering the liquid from the first cavity to a pump/turbine unit located at a level below the first cavity to thereby drive the unit so that it produces electrical power. Such power would be produced, for example, during peak load demand periods when the need for power was greatest. Liquid discharged from the pump/turbine unit is delivered to the second cavity for temporary storage. During low power demand periods, electrical power is supplied to the pump/turbine unit to cause the unit to pump liquid from the second cavity back up to the first cavity to await repeat of the power producing phase of the cycle.

5 Claims, 1 Drawing Figure

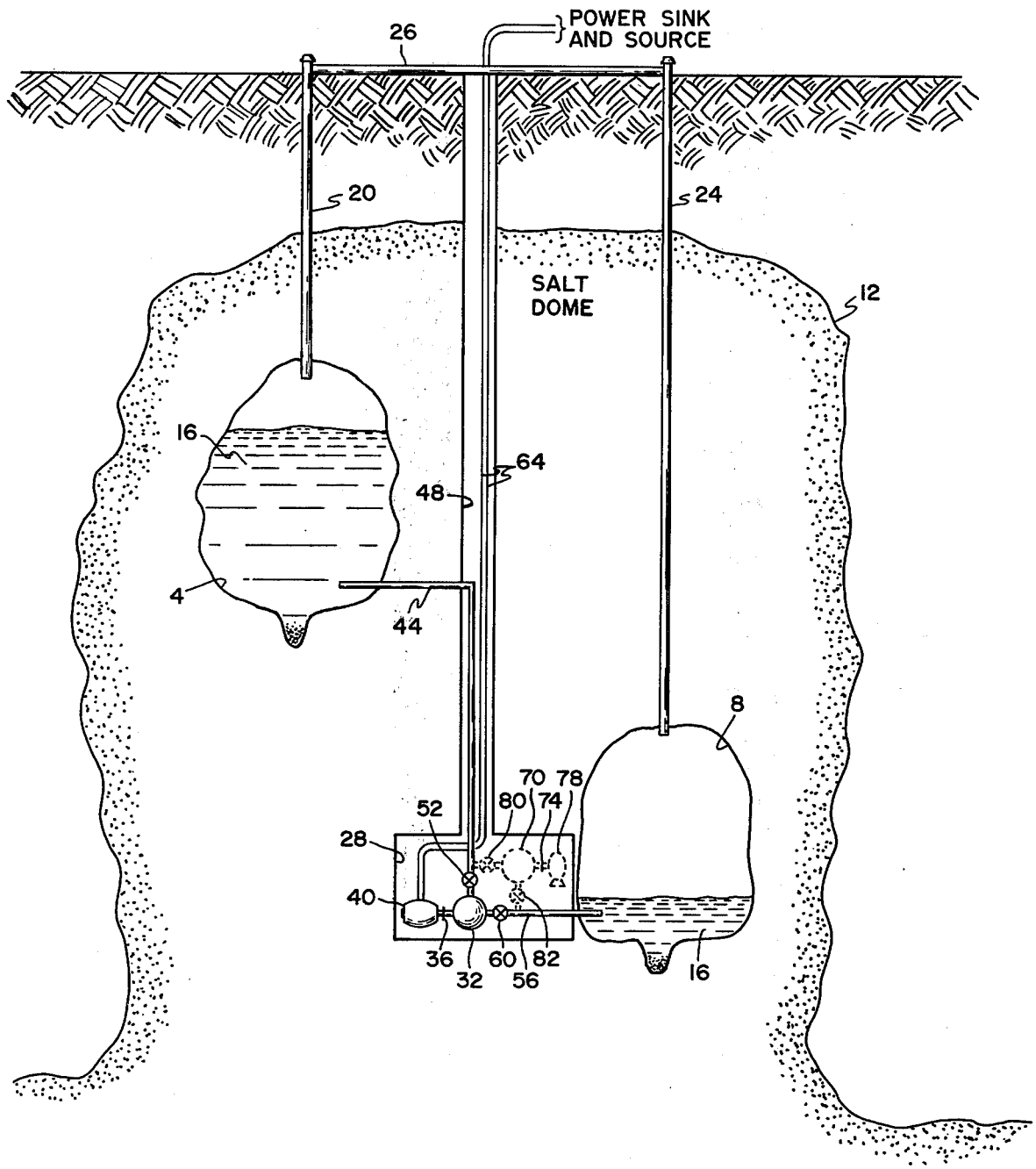

UNDERGROUND PUMPED LIQUID ENERGY STORAGE SYSTEM AND METHOD

BACKGROUND OF THE INVENTION

This invention relates to a system and method for utilizing hydrocarbon liquids, or other liquids in which salt is insoluble, in underground cavities formed in salt deposits for producing electrical power.

So-called pumped energy storage systems are designed to, in effect, take surplus power from electrical power generating systems during low power demand or off-peak periods, store the power, and then recover it for use during peak power demand periods. This might be accomplished by hydro pumped storage systems consisting of a surface reservoir, an excavated underground reservoir, an underground powerhouse having an electrical power generating unit, and conduits for connecting the surface reservoir to the underground powerhouse and also for connecting the powerhouse to the underground reservoir. During heavy load periods, water from the surface reservoir is directed to the powerhouse to drive the power generating units, with the discharge being directed to the underground reservoir. During light load periods, water from the underground reservoir is pumped back to the surface reservoir to await a heavy load period when additional power will again be needed. Such a system is described in "An Assessment of Energy Storage System Suitable For Use By Electric Utilities", EPRI EM-264, Project 225, ERDA E (11-1)-2501, Final Report, Volume 3, July, 1976, prepared by Public Service Electric and Gas Company Research and Development Department, Newark, New Jersey 07101. Also see U.S. Pat. No. 3,643,426, issued Feb. 22, 1972.

Some of the drawbacks of pumped energy storage systems such as that described above are the unavailability of suitable sites for both above ground and underground reservoirs, the possible harmful environmental impact of providing above ground reservoirs for energy storage, and the high cost and difficulty of hard-rock mining or excavating the underground reservoir.

In the past, underground reservoirs have typically been utilized or at least suggested for utilization for storing petroleum products. Thus, U.S. Pat. No. 3,385,067 discloses storing petroleum in a pair of interconnected underground cavities formed in a salt bed. More recently, an article in Newsweek (Aug. 22, 1977 at page 55) described the government's strategic oil reserve program in which oil would be stored in cavities formed in salt domes. This is considered an attractive alternative to above ground storage of petroleum because of the greatly reduced costs of the underground storage. Of course, with such passive storage of petroleum, the petroleum is not utilized in any way until it is removed from storage for use as a fuel, lubricant, etc.

SUMMARY OF THE INVENTION

It is an object of the invention to provide a new and inexpensive underground pumped energy storage system and method.

It is also an object of the invention to provide such a system which is located entirely underground in salt formations.

It is a further object of the invention to provide an arrangement which can serve to both store hydrocarbon liquids and utilize such liquids for the production of electrical power during periods of high power demand.

It is still another object of the present invention to provide a system and method of utilizing petroleum products stored underground for the production of electrical power.

The above and other objects of the invention are realized in a specific illustrative embodiment of an underground pumped energy storage system which includes a pair of cavities formed in an underground salt deposit, with one of the cavities being located at a higher level than the other cavity. Liquid in which salt is substantially insoluble, such as hydrocarbon liquid, saturated salt brine, etc., is disposed in the cavities for use as a working medium for the generation of electrical power. Electrical power generating apparatus is disposed at a level below the upper cavity and is coupled to the upper cavity by a conduit through which the liquid may be delivered to the generating apparatus. Another conduit delivers the discharge liquid from the electrical power generating means to the lower cavity.

During peak power demand periods, liquid is directed through the conduit to the electrical power generating apparatus to cause the production of electrical power, and the discharge liquid is delivered to the lower cavity. Then, during periods of low power demand, the liquid in the lower cavity is pumped back to the higher cavity.

With the above-described arrangement, hydrocarbon liquids which would otherwise be idle in underground cavity storage may be utilized as a working medium for the production of electrical power during high power demand periods. The use of cavities formed in salt deposits is desirable because of the ease with which the cavities may be formed simply by piping the water into the deposit to dissolve the salt and make brine and then pumping the brine from the resulting cavity. The cavities are substantially impermeable to hydrocarbon liquids and require little maintenance. Further, since the power production takes place underground, there is little impact on the environment.

Although the invention is especially advantageous for use with hydrocarbon liquids as the working medium, other liquids, such as saturated salt brine, which do not dissolve salt might also be used for electrical power production. Of course, the advantage of combining the storage of liquid with use of the liquid for power production would not be present with the salt brine arrangement since there is no need to store salt brine. The use of cavities formed in salt deposits greatly reduces the cost of the arrangement because of the avoidance of the high cost of hard rock mining.

BRIEF DESCRIPTION OF THE DRAWINGS

The above and other objects, features and advantages of the present invention will become apparent from a consideration of the following detailed description presented in connection with the accompanying drawing which shows a graphic representation of one embodiment of an underground pumped energy storage system made in accordance with the principles of the present invention.

DETAILED DESCRIPTION

Referring to the drawing there is shown a first cavity 4 and a second cavity 8 formed in a salt dome 12 located under the surface of the ground. These cavities may be formed simply by supplying water to the desired locations of the cavities in the salt dome, dissolving the salt to make salt brine, and then pumping the brine to the surface leaving the cavities. See, for example, Symposia on Salt (Proceedings), Vol. I-V, Northern Ohio Geological Society, Cleveland, Ohio. As indicated in the aforecited Newsweek article, and in the U.S. Geological Service Bulletin 1148, thick salt deposits are quite prevalent in the gulf coast states, as well as in midwestern and western states, and would serve as ideal locations for practicing the present invention. It has been found that these salt formations are quite impermeable to hydrocarbon liquids and essentially stable to pressures.

As shown in the drawing, cavity 4 is formed in the salt dome 12 at a higher level than is cavity 8. A suitable liquid 16 is placed into cavity 4 via a pipe or conduit 20 which extends from above ground to the cavity 4. Although such liquid may be any liquid in which salt is insoluble, the discussion hereafter will assume that the liquid is a hydrocarbon such as oil or a petroleum product. The conduit 20 serves to allow for subsequent storage or removal of the liquid 16 in the cavities. Of course, to remove liquid from the cavity 4, the conduit 20 would be positioned to extend into the lower part of the cavity. As will be explained further hereafter, hydrocarbon liquid may also be placed in cavity 8 either from cavity 4 via power producing apparatus or via a conduit 24 extending from above ground to the cavity 8. The cavities 4 and 8 may thus be used simply for storage of hydrocarbon liquids as part of the "strategic oil reserve" or for both storage and production of electrical power during peak load periods as will next be discussed.

Located generally between the cavities 4 and 8 and near the level of cavity 8 is a chamber 28 formed in the salt dome 12. A tunnel 48 extends from the chamber 28 to ground level to provide access to the chamber. Contained in the chamber is a reversible pump/turbine unit 32 coupled by mechanical coupling 36 to a generator/motor unit 40. A conduit 44 extends from near the bottom of cavity 4 to the tunnel 48 and from there downwardly to the pump/turbine unit 32. A value 52 controls the flow of liquid through the conduit 4. Another conduit 56 extends from the pump/turbine unit 32 to the lower part of cavity 8. A valve 60 controls the flow of liquid between the pump/turbine unit 32 and the cavity 8. The pump/turbine unit might illustratively be a conventional centrifugal power-recovery pump-turbine such as those described in *Chemical Engineers Hand Book*, Perry, R. H., and Chilton, C. H., Editors, Fifth Edition, McGraw Hille, New York, 1973, pages 24–36 et seq. The generator/motor unit 40 is conventional equipment capable of functioning as a generator to produce electricity when driven by an external power source, or as a motor when electricity is supplied to the unit. The generator/motor unit is connected by power line 64 to a power sink or source (not shown).

In operation, hydrocarbon liquid 16 is supplied to cavity 4 until a sufficient quality is obtained to act as a peak power source liquid. When power is needed, valves 52 and 60 are opened so that liquid 16 flows through conduit 44 to the pump/turbine unit 32 to drive the unit. The discharge liquid flows through conduit 56 into cavity 8. Driving the pump/turbine unit 32 causes the unit to drive the generator/motor unit 50 to produce electrical power which is supplied by power lines 64 to a power sink (not shown). Liquid 16 is directed to the pump/turbine unit 32 until either the demand for power abates or all of the liquid in the cavity 4 has been supplied to the pump/turbine unit 32. At this point, cavity 8 would typically contain more liquid than would cavity 4. As liquid is discharged into cavity 8, the gas in the cavity space may be forced out through conduit 24 to the atmosphere. Alternatively, conduits 20 and 24 are capped, as shown, to prevent escape of potentially noxious fumes, and a conduit 26 is provided to join conduits 20 and 24 to carry the fumes and gas between the cavities as the liquid 16 is moved between the cavities.

After completion of power production, and preferably during a low power demand period, the liquid in cavity 8 is pumped back up to cavity 4. This is done by supplying power via power line 64 to the generator/motor unit 40 to drive the motor and thereby drive the pump/turbine unit 32. The unit 32 pumps liquid from cavity 8 through conduits 56 and 44 back up to cavity 4, where the liquid will remain until power from the system is again needed, and gas is forced from the cavity 4 through conduits 20, 26 and 24 back to cavity 8.

Although a reversible pump/turbine unit 32 and a reversible generator/motor unit 40 are shown and are preferred for the present invention, separate units could be utilized. Thus, a pump 70 is shown in dotted outline in the chambr 28 coupled by a mechanical coupling 74 to a motor 78, also shown in dotted line. If a separate pump 70 and motor 78 were used, then the unit 32 would simply be a turbine and the unit 40 would be only a generator. Then, when liquid was being supplied to the turbine 32, valves 52 and 60 would be opened and valves 80 and 82, coupling the pump 70 to the conduits 44 and 56 respectively would be closed. When pump 70 were operating to pump liquid from cavity 8 up to cavity 4, then valves 52 and 60 would be closed and valves 80 and 82 would be opened. The valves are shown schematically and would, advantageously, be remotely operated. Also, power lines would be coupled to motor 78 to drive the motor.

In the manner described above, a pair of cavities formed in a salt deposit is supplied with a liquid which will not dissolve the salt and this liquid is utilized for production of electrical power preferably during high power demand periods. Such high demand periods typically occur during the day, whereas at night the power demand slackens off. Similarly, more power is consumed on week days than on weekends so that weekends generally constitute low power demand periods. All this is well known in the power production industry. Since the described system is entirely underground, there would be little environmental impact from such a system. Also, since plans are already underway to store oil in underground cavities formed in salt domes, little additional expense would result in implementing the above-described system to increase the efficiency and economy of the electric power industry.

It is to be understood that the above-described arrangement is only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. An underground pumped energy storage system comprising first and second cavities formed in an underground salt deposit, said first cavity being spaced from and at a higher level than said second cavity, a hydrocarbon liquid disposed in one or both of said cavities, electrical power generating means disposed at a level below said first cavity for generating electricity when liquid is applied thereto under pressure, first conduit means for delivering liquid from said first cavity to said generating means to drive said generating means, second conduit means for conveying liquid from said generating means to said second cavity, and means for pumping liquid from said second cavity to said first cavity.

2. A system as in claim 1 further comprising a chamber formed in the salt deposit generally near the level of said second cavity, and wherein said electrical power generating means is disposed in said chamber.

3. A system as in claim 2 wherein said electrical power generating means and said pumping means comprise a reversible pump/turbine means for operating in either a turbine mode to produce a rotating drive force when liquid is applied thereto from said first cavity, or a pumping mode to pump liquid from said second cavity to said first cavity when a rotating drive force is applied thereto, and a generator/motor means drivingly coupled to said pump/turbine means for operating in either a generator mode to produce electricity when driven by said pump/turbine means, or a motor mode to drive said pump/turbine means when electricity is applied to the generator/motor means.

4. A system as in claim 1 further comprising a third conduit means interconnecting said first and second cavities to carry gases therebetween as said liquid is moved between the cavities.

5. A method of generating electrical power during peak power demand periods comprising providing a first cavity in an underground salt deposit, providing a second cavity in the salt deposit at a level below the level of said first cavity, supplying a hydrocarbon liquid to said first cavity, delivering, by gravity feed and during a peak power demand period, liquid from the first cavity to an electrical power generating means located below the level of said first cavity to thereby drive the generating means to produce electricity, delivering discharge liquid from the generating means to said second cavity, and pumping, during a low power demand period, liquid from said second cavity to said first cavity.

* * * * *